(12) United States Patent
Chang et al.

(10) Patent No.: US 7,526,599 B2
(45) Date of Patent: Apr. 28, 2009

(54) METHOD AND APPARATUS FOR EFFECTIVELY ENABLING AN OUT OF SEQUENCE WRITE PROCESS WITHIN A NON-VOLATILE MEMORY SYSTEM

(75) Inventors: Robert C Chang, Danville, CA (US); Bahman Qawami, San Jose, CA (US); Farshid Sabet-Sharghi, San Jose, CA (US)

(73) Assignee: SanDisk Corporation, Milpitas, CA (US)

(*) Notice: Subject to any disclaimer, the term of this patent is extended or adjusted under 35 U.S.C. 154(b) by 352 days.

(21) Appl. No.: 10/679,008

(22) Filed: Oct. 2, 2003

(65) Prior Publication Data

US 2004/0103241 A1    May 27, 2004

Related U.S. Application Data

(60) Provisional application No. 60/421,725, filed on Oct. 28, 2002.

(51) Int. Cl.
*G06F 12/00* (2006.01)
(52) U.S. Cl. ..................................... 711/103
(58) Field of Classification Search ................ 711/103; 714/710
See application file for complete search history.

(56) References Cited

U.S. PATENT DOCUMENTS

| 5,222,109 A | | 6/1993 | Pricer ........................ 377/24.1 |
| 5,297,148 A | | 3/1994 | Harari et al. ................ 371/10.2 |
| 5,388,083 A | | 2/1995 | Assar et al. .................. 365/218 |
| 5,438,573 A | | 8/1995 | Mangan et al. ............. 371/10.3 |
| 5,488,711 A | * | 1/1996 | Hewitt et al. ................. 711/103 |
| 5,568,423 A | * | 10/1996 | Jou et al. ............... 365/185.33 |
| 5,568,439 A | | 10/1996 | Harari ........................ 365/218 |
| 5,572,466 A | * | 11/1996 | Sukegawa .............. 365/185.33 |

(Continued)

FOREIGN PATENT DOCUMENTS

JP          62-283496         12/1987

(Continued)

OTHER PUBLICATIONS

Kim, Jesung et al., "A Space-Efficient Flash Translation Layer for Compactflash Systems", IEEE Transactions on Consumer Electronics, vol. 48, No. 2, May 2002.

*Primary Examiner*—Sheng-Jen Tsai
(74) *Attorney, Agent, or Firm*—Brinks Hofer Gilson & Lione

(57) ABSTRACT

Methods and apparatus for enabling contents to be efficiently stored in physical blocks of a non-volatile memory are disclosed. According to one aspect of the present invention, a method for performing a write operation in a non-volatile memory system which has a memory unit includes writing a first set of contents into a first physical sub-unit of the memory unit and writing a second set of contents into a second physical sub-unit of the memory unit after the first set of contents is written into the first physical sub-unit. The first physical sub-unit is sequentially before the second physical sub-unit in the memory unit. The first set of contents is associated with a second logical sub-unit of a logical unit and the second set of contents is associated with a first logical sub-unit of the logical unit that is sequentially before the second logical sub-unit in the logical unit.

9 Claims, 9 Drawing Sheets

U.S. PATENT DOCUMENTS

| | | | |
|---|---|---|---|
| 5,598,370 A | 1/1997 | Niijima et al. | 365/185.33 |
| 5,603,001 A * | 2/1997 | Sukegawa et al. | 711/103 |
| 5,737,742 A * | 4/1998 | Achiwa et al. | 711/103 |
| 5,754,567 A * | 5/1998 | Norman | 714/773 |
| 5,832,493 A * | 11/1998 | Marshall et al. | 707/101 |
| 5,835,935 A | 11/1998 | Estakhri et al. | 711/103 |
| 5,845,313 A | 12/1998 | Estakhri et al. | 711/103 |
| 5,860,082 A | 1/1999 | Smith et al. | 711/103 |
| 5,907,856 A | 5/1999 | Estakhri et al. | 711/103 |
| 5,924,113 A | 7/1999 | Estakhri et al. | 711/103 |
| 6,000,006 A * | 12/1999 | Bruce et al. | 711/103 |
| 6,016,275 A | 1/2000 | Han | 365/185.29 |
| 6,081,447 A | 6/2000 | Lofgren et al. | 365/185.02 |
| 6,115,785 A | 9/2000 | Estakhri et al. | 711/103 |
| 6,125,435 A | 9/2000 | Estakhri et al. | 711/201 |
| 6,182,239 B1 * | 1/2001 | Kramer | 714/5 |
| 6,230,233 B1 * | 5/2001 | Lofgren et al. | 711/103 |
| 6,236,593 B1 * | 5/2001 | Hong et al. | 365/185.11 |
| 6,260,156 B1 | 7/2001 | Garvin et al. | 714/8 |
| 6,282,624 B1 | 8/2001 | Kimura et al. | |
| 6,426,893 B1 | 7/2002 | Conley et al. | 365/185.11 |
| 6,430,650 B1 * | 8/2002 | Miyauchi | 711/103 |
| 6,970,890 B1 * | 11/2005 | Bruce et al. | 707/202 |
| 2002/0085433 A1 * | 7/2002 | Tomori et al. | 365/200 |

FOREIGN PATENT DOCUMENTS

| | | |
|---|---|---|
| JP | 62-283497 | 12/1987 |
| WO | 99/18509 A1 | 4/1999 |

* cited by examiner

METHOD AND APPARATUS FOR EFFECTIVELY ENABLING AN OUT OF SEQUENCE WRITE PROCESS WITHIN A NON-VOLATILE MEMORY SYSTEM

The present invention claims priority of U.S. Provisional Patent Application No. 60/421,725, filed Oct. 28, 2002, which is hereby incorporated by reference in its entirety.

CROSS REFERENCE TO RELATED APPLICATIONS

The present invention is related to co-pending U.S. patent application Ser. Nos. 10/281,739, 10/281,823, 10/281,670, 10/281,824, 10/281,631, 10/281,855, 10/281,762, 10/281,696, 10/281,626, and 10/281,804, as well as co-pending U.S. Provisional Patent Application Nos. 60/421,910, 60/421,965, 60/422,166, 60/421,746, and 60/421,911, each filed on Oct. 28, 2002, which are each incorporated herein by reference in their entireties.

BACKGROUND OF THE INVENTION

1. Field of Invention

The present invention relates generally to mass digital data storage systems. More particularly, the present invention relates to systems and methods for enabling pages of a block to effectively be written to substantially out of sequence.

2. Description of the Related Art

The use of non-volatile memory systems such as flash memory storage systems is increasing due to the compact physical size of such memory systems, and the ability for non-volatile memory to be repetitively reprogrammed. The compact physical size of flash memory storage systems facilitates the use of such storage systems in devices which are becoming increasingly prevalent. Devices which use flash memory storage systems include, but are not limited to, digital cameras, digital camcorders, digital music players, handheld personal computers, and global positioning devices. The ability to repetitively reprogram non-volatile memory included in flash memory storage systems enables flash memory storage systems to be used and reused.

In general, flash memory storage systems may include flash memory cards and flash memory chip sets. Flash memory chip sets generally include flash memory components and a controller components. Typically, a flash memory chip set may be arranged to be assembled into an embedded system. The manufacturers of such assemblies or host systems typically acquire flash memory in component-form, as well as other components, then assemble the flash memory and the other components into a host system.

The ability to efficiently use flash memory is crucial in enabling an overall flash memory system to meet high performance standards. In general, an inefficient use of flash memory may result in frequent erase operations and frequent write operations which may slow the operation of the overall flash memory system considerably. For example, as shown in FIG. 1, a physical block 100 may include contents 104 associated with a third page and an a third to last page of a logical block (not shown). When an update 110 associated with the logical block (not shown) is received that is associated with a fourth page of the logical block, although space is available within physical block 100, update 110 may not be stored into physical block 100, since a page 'N-2' 112a has already been written to, and update 110 would be intended for a page '3' 112b. That is, when later pages of physical block 100 such as page 'N-2' 112a have been written to, previous pages of physical block 100 such as page '3' 112b may not be written to.

Allowing update 110 to be written into physical block 100 would generally result in an out-of-sequence violation, e.g., a write violation. In some flash memory systems which include NAND flash memory such as MLC NAND flash memory, out-of-sequence writes and partial writes are not allowed. Hence, it is often not possible to write update 110 into page '3' 112b once contents 104b are present in page 'N-2' 112a.

In order to accommodate update 110, a new physical block 120 is typically obtained. Then, contents 104a, update 110, and contents 104b are written into new physical block 120. Once new physical block 120 is written into, then contents of physical block 100 may be erased. When updates associated with a fourth page of the logical block (not shown) are constantly made, repeated processes of obtaining a new physical block, writing to the new physical block, and erasing old physical blocks may be necessary. As a result, substantially only three pages of each physical block which contains 'N' pages may be written, while a number of pages, i.e., N-3 pages, remain substantially empty. Effectively wasting N-3 pages in each physical block, while generally requiring a relatively high number of write and erase processes, may cause an overall flash memory system to operate inefficiently. Enabling pages of a physical block such as physical block 100 to be written such that memory resources may be used more efficiently may allow the performance of an overall flash memory system such as an MLC NAND flash memory system to be improved.

Therefore, what is needed is a system and a method which allows memory resources in a non-volatile memory system to be used more efficiently. Specifically, what is desired is a system and a method which may effectively allow physical pages of a physical block in a memory system such as an MLC NAND flash memory system to be written substantially out-of-sequence.

SUMMARY OF THE INVENTION

The present invention relates to a system and a method for enabling contents to be efficiently stored in physical blocks. According to one aspect of the present invention, a method for performing a write operation in a non-volatile memory system which has a memory unit includes writing a first set of contents into a first physical sub-unit of the memory unit and writing a second set of contents into a second physical sub-unit of the memory unit after the first set of contents is written into the first physical sub-unit. The first physical sub-unit is sequentially before the second physical sub-unit in the memory unit. The first set of contents is associated with a second logical sub-unit of a logical unit and the second set of contents is associated with a first logical sub-unit of the logical unit that is sequentially before the second logical sub-unit in the logical unit.

In one embodiment, the memory unit is a physical block, the logical unit is a logical block, the first physical sub-unit is a first physical page, the second physical sub-unit is a second physical page, the first logical sub-unit is a first logical page, and the second logical sub-unit is a second logical page. In another embodiment, the memory unit may be a part of an MLC NAND memory.

Allowing for storage into a physical block of contents associated with a logical page which is sequentially before a logical page for which associated contents have already been written into the physical block enables the physical block to effectively be written to in an out-of-sequence manner from the perspective of the contents, although the actual physical pages are written in sequence. By allowing contents of a logical block to effectively be written out of order into a physical block enables the physical block to be used more efficiently in that the number of needed write and erase operations may be reduced. For instance, grouping pages within blocks such that a group within a physical block may be obtained in lieu of new physical block when a substantially out-of-sequence write operation is to occur enables the overall efficiency associated with writing pages to be improved.

According to another aspect of the present invention, a method for providing contents associated with a logical block to a physical block that is a part of a non-volatile memory of a memory system includes obtaining a first set of contents associated with a first logical page of a first logical group of the logical block, as well as storing the first set of contents in the physical block. Storing the first set of contents in the physical block includes storing the first set of contents in a first physical page of a first physical group of the physical block and storing an indicator in the first physical group which identifies the first set of contents as being associated with the first logical group.

In one embodiment, the first physical group includes a plurality of physical pages which has a beginning physical page at the beginning of the first physical group, and storing the indicator in the first physical group includes storing the indicator in the beginning physical page. In another embodiment, the method also includes obtaining a second set of contents associated with the logical block, and storing the second set of contents in the first physical group when the second set of contents is associated with a second logical page of the first logical group and the second logical page of the first logical group is sequentially after the first logical page within the first logical group.

These and other advantages of the present invention will become apparent upon reading the following detailed descriptions and studying the various figures of the drawings.

BRIEF DESCRIPTION OF THE DRAWINGS

The invention may best be understood by reference to the following description taken in conjunction with the accompanying drawings in which:

FIG. 2b is a diagrammatic representation a memory device, e.g., memory device 120 of FIG. 2a.

DETAILED DESCRIPTION OF THE EMBODIMENTS

The need for pages in some non-volatile memory systems such as MLC NAND memory systems to be written in sequence, and without partial writes, may often result in operations used to update the contents associated with a logical block including a relatively high number of write and erase operations. The relatively high number of write and erase operations may occur, for example, when contents associated with a particular logical page of a logical block are constantly updated. Such updates may often require different physical blocks to be obtained, and necessitate merging contents of physical blocks and, hence, writing and erasing. As write and erase operations are typically time-consuming, a high number of write and erase operations may adversely affect the performance of the non-volatile memory systems.

Reducing the overall amount of overhead and time that is needed to store or otherwise rewrite updated pages may enable an overall system, e.g., an overall host system with an embedded non-volatile memory chip such as an MLC NAND memory chip, to operate more efficiently. Grouping pages within blocks into groups effectively enables pages in overall blocks to be written substantially out-of-sequence with respect to the blocks. The grouping of pages within blocks is generally described in co-pending U.S. patent application Ser. No. 10/281,855, which is incorporated by reference in it entirety. By grouping pages within blocks such that a group within a physical block may be obtained in lieu of new physical block in order to write a page into the physical block when there is at least one available group within the physical block, the overall efficiency associated with writing pages may generally be improved. Further, although pages within each group of a physical block are written to substantially in sequence, with respect to the physical block, the contents of the pages may effectively be written out-of-sequence. Specifically, pages associated with a logical block may be written into a physical block such that contents associated with a first logical page of the logical block are written into the physical block after contents associated with a second logical page of the logical block which is sequentially after the first logical page are written into the physical block. However, the page in the physical block into which the contents associated with the first page of the logical block are written is sequentially after the page in the physical block into which the contents associated with the second page of the logical block are written.

Figure 1:
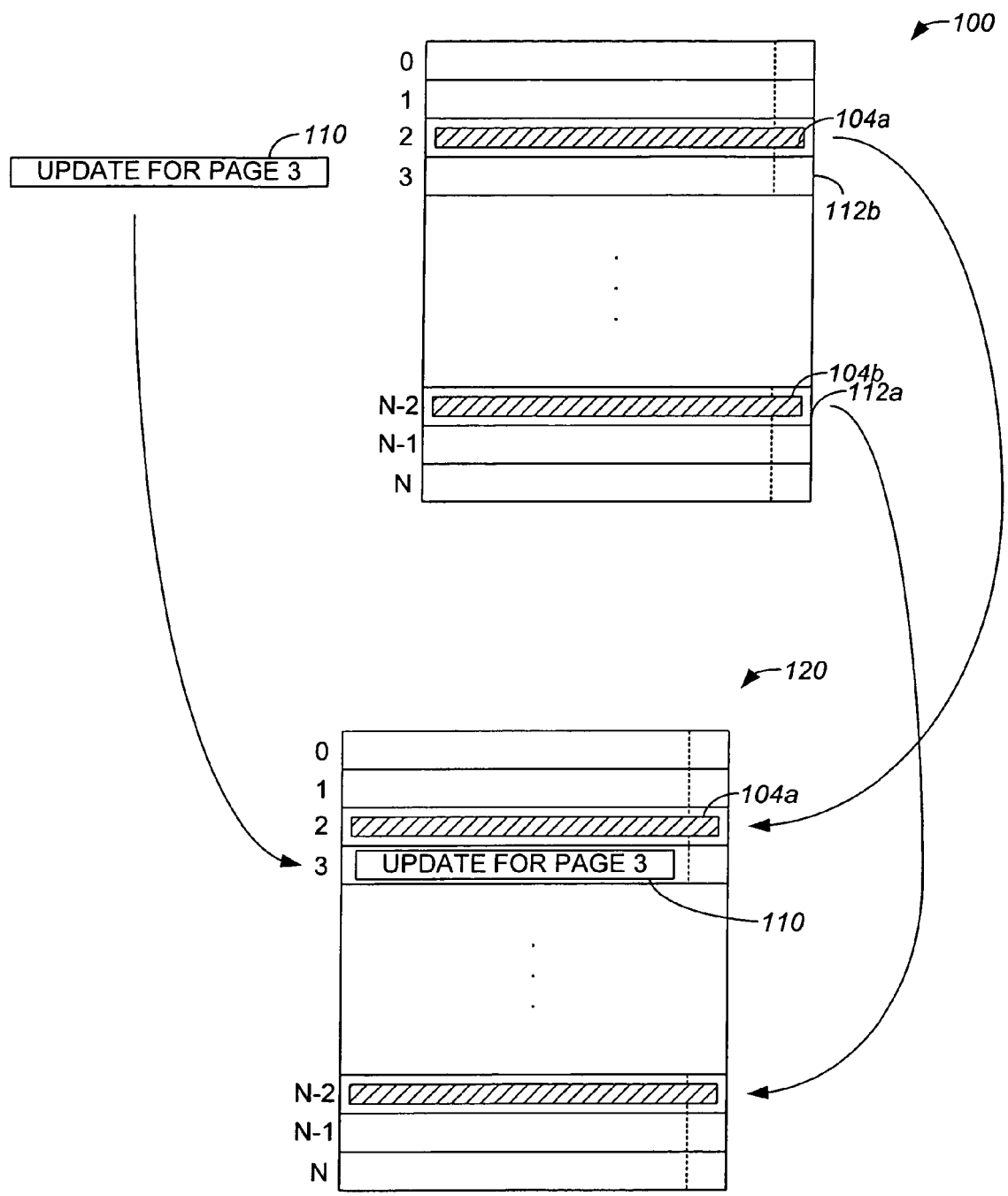
FIG. 1 is a diagrammatic representation of a first physical block with a first set of contents and an update which are to be written into a second physical block.
Figure 2A:
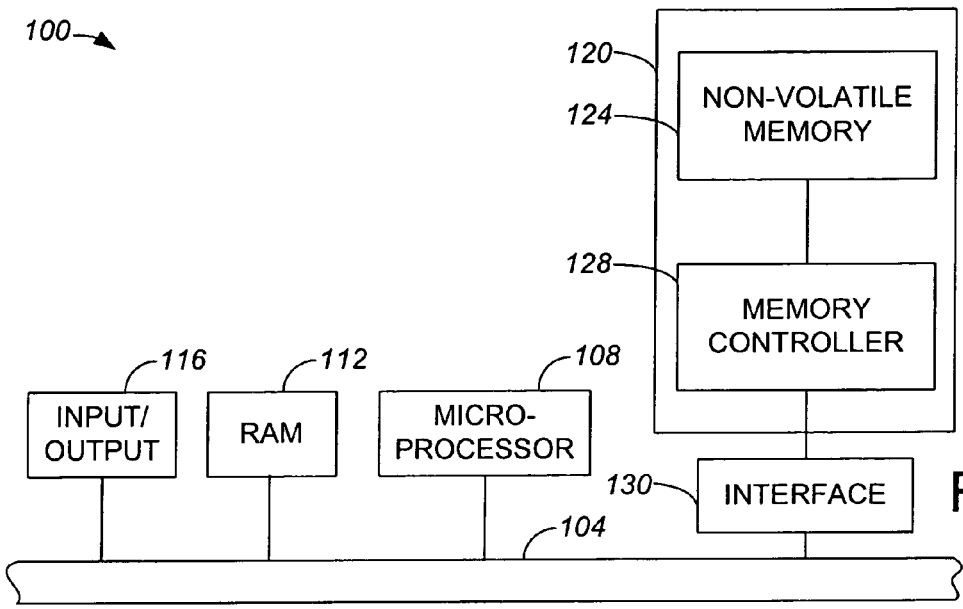
FIG. 2a is a diagrammatic representation of a general host system which includes a non-volatile memory.

Flash memory systems or, more generally, non-volatile memory devices which may benefit from the use of groups within blocks which effectively enable updates associated with a logical block to be written in a substantially out of sequence manner generally include flash memory, e.g., NAND or MLC NAND, cards and chip sets. Typically, flash memory systems are used in conjunction with a host system such that the host system may write data to or read data from the flash memory systems. However, some flash memory systems include embedded flash memory and software which executes on a host to substantially act as a controller for the embedded flash memory, as will be discussed below with respect to FIG. 2c. Referring to FIG. 2a, a general host system which includes a non-volatile memory device, e.g., a CompactFlash memory card, will be described. A host or computer system 100 generally includes a system bus 104 which allows a microprocessor 108, a random access memory (RAM) 112, and input/output circuits 116 to communicate. It should be appreciated that host system 100 may generally include other components, e.g., display devices and networking device, which are not shown for purposes of illustration.

In general, host system 100 may be capable of capturing information including, but not limited to, still image information, audio information, and video image information. Such information may be captured in real-time, and may be transmitted to host system 100 in a wireless manner. While host system 100 may be substantially any system, host system 100 is typically a system such as a digital camera, a video camera, a cellular communications device, an audio player, or a video player. It should be appreciated, however, that host system 100 may generally be substantially any system which stores data or information, and retrieves data or information.

Host system 100 may also be a system which either only captures data, or only retrieves data. That is, host system 100 may be, in one embodiment, a dedicated system which stores data, or host system 100 may be a dedicated system which reads data. By way of example, host system 100 may be a memory writer which is arranged only to write or store data. Alternatively, host system 100 may be a device such as an MP3 player which is typically arranged to read or retrieve data, and not to capture data.

A non-volatile memory device 120 which, in one embodiment, is a removable non-volatile memory device, is arranged to interface with bus 104 to store information. An optional interface block 130 may allow non-volatile memory device 120 to interface indirectly with bus 104. When present, input/output circuit block 116 serves to reduce loading on bus 104, as will be understood by those skilled in the art. Non-volatile memory device 120 includes non-volatile memory 124 and an optional memory control system 128. In one embodiment, non-volatile memory device 120 may be implemented on a single chip or a die. Alternatively, non-volatile memory device 120 may be implemented on a multi-chip module, or on multiple discrete components which may form a chip set and may be used together as non-volatile memory device 120. One embodiment of non-volatile memory device 120 will be described below in more detail with respect to FIG. 2b.

Non-volatile memory 124, e.g., flash memory such as NAND flash memory or an MLC NAND flash memory, is arranged to store data such that data may be accessed and read as needed. Data stored in non-volatile memory 124 may also be erased as appropriate, although it should be understood that some data in non-volatile memory 124 may not be erasable. The processes of storing data, reading data, and erasing data are generally controlled by memory control system 128 or, when memory control system 128 is not present, by software executed by microprocessor 108. The operation of non-volatile memory 124 may be managed such that the lifetime of non-volatile memory 124 is substantially maximized by essentially causing sections of non-volatile memory 124 to be worn out substantially equally.

Non-volatile memory device 120 has generally been described as including an optional memory control system 128, i.e., a controller. Often, non-volatile memory device 120 may include separate chips for non-volatile memory 124 and memory control system 128, i.e., controller, functions. By way of example, while non-volatile memory devices including, but not limited to, PC cards, CompactFlash cards, MultiMedia cards, and secure digital cards include controllers which may be implemented on a separate chip, other non-volatile memory devices may not include controllers that are implemented on a separate chip. In an embodiment in which non-volatile memory device 120 does not include separate memory and controller chips, the memory and controller functions may be integrated into a single chip, as will be appreciated by those skilled in the art. Alternatively, the functionality of memory control system 128 may be provided by microprocessor 108, as for example in an embodiment in which non-volatile memory device 120 does not include memory controller 128, as discussed above.

Figure 2B:
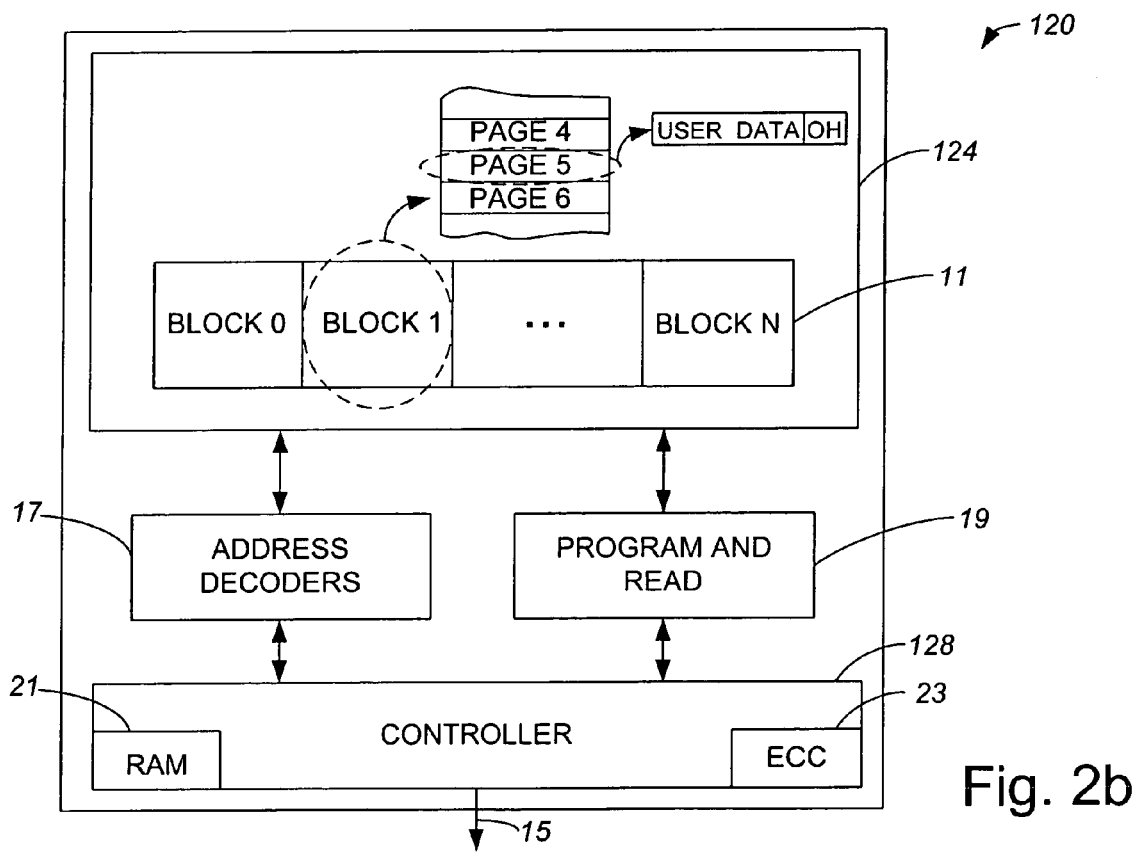

With reference to FIG. 2b, non-volatile memory device 120 will be described in more detail in accordance with an embodiment of the present invention. As described above, non-volatile memory device 120 includes non-volatile memory 124 and may include memory control system 128. Memory 124 and control system 128, or controller, may be primary components of non-volatile memory device 120, although when memory 124 is an embedded NAND device such as an embedded MLC NAND memory, for example, non-volatile memory device 120 may not include control system 128. Memory 124 may be an array of memory cells formed on a semiconductor substrate, wherein one or more bits of data are stored in the individual memory cells by storing one of two or more levels of charge on individual storage elements of the memory cells. A non-volatile flash electrically erasable programmable read only memory (EEPROM) is an example of a common type of memory for such systems.

When present, control system 128 communicates over a bus 15 to a host computer or other system that is using the memory system to store data. Bus 15 is generally a part of bus 104 of FIG. 2a. Control system 128 also controls operation of memory 124, which may include a memory cell array 11, to write data provided by the host, read data requested by the host and perform various housekeeping functions in operating memory 124. Control system 128 generally includes a general purpose microprocessor which has associated non-volatile software memory, various logic circuits, and the like. One or more state machines are often also included for controlling the performance of specific routines.

Memory cell array 11 is typically addressed by control system 128 or microprocessor 108 through address decoders 17. Decoders 17 apply the correct voltages to gate and bit lines of array 11 in order to program data to, read data from, or erase a group of memory cells being addressed by the control system 128. Additional circuits 19 include programming drivers that control voltages applied to elements of the array that depend upon the data being programmed into an addressed group of cells. Circuits 19 also include sense amplifiers and other circuits necessary to read data from an addressed group of memory cells. Data to be programmed into array 11, or data recently read from array 11, are typically stored in a buffer memory 21 within control system 128. Control system 128 also usually contains various registers for temporarily storing command and status data, and the like.

Array 11 is divided into a large number of BLOCKS 0-N memory cells. As is common for flash EEPROM systems, the block is typically the smallest unit of erase. That is, each block contains the minimum number of memory cells that are erased together. Each block is typically divided into a number of pages. As will be appreciated by those skilled in the art, a page may be the smallest unit of programming. That is, a basic programming operation writes data into or reads data from a minimum of one page of memory cells. One or more sectors of data are typically stored within each page. As shown in FIG. 2b, one sector includes user data and overhead data. Overhead data typically includes an error correction code (ECC) that has been calculated from the user data of the sector. A portion 23 of the control system 128 calculates the ECC when data is being programmed into array 11, and also checks the ECC when data is being read from array 11. Alternatively, the ECCs are stored in different pages, or different blocks, than the user data to which they pertain.

A sector of user data is typically 512 bytes, corresponding to the size of a sector in magnetic disk drives. Overhead data, or redundant data, is typically an additional 16 bytes. One sector of data is most commonly included in each page but two or more sectors may instead form a page. Any number of pages may generally form a block. By way of example, a block may be formed from eight pages up to 512, 1024 or more pages. The number of blocks is chosen to provide a desired data storage capacity for the memory system. Array 11 is typically divided into a few sub-arrays (not shown), each of which contains a proportion of the blocks, which operate somewhat independently of each other in order to increase the degree of parallelism in the execution of various memory operations. An example of the use of multiple sub-arrays is described in U.S. Pat. No. 5,890,192, which is incorporated herein by reference in its entirety.

Figure 2C:
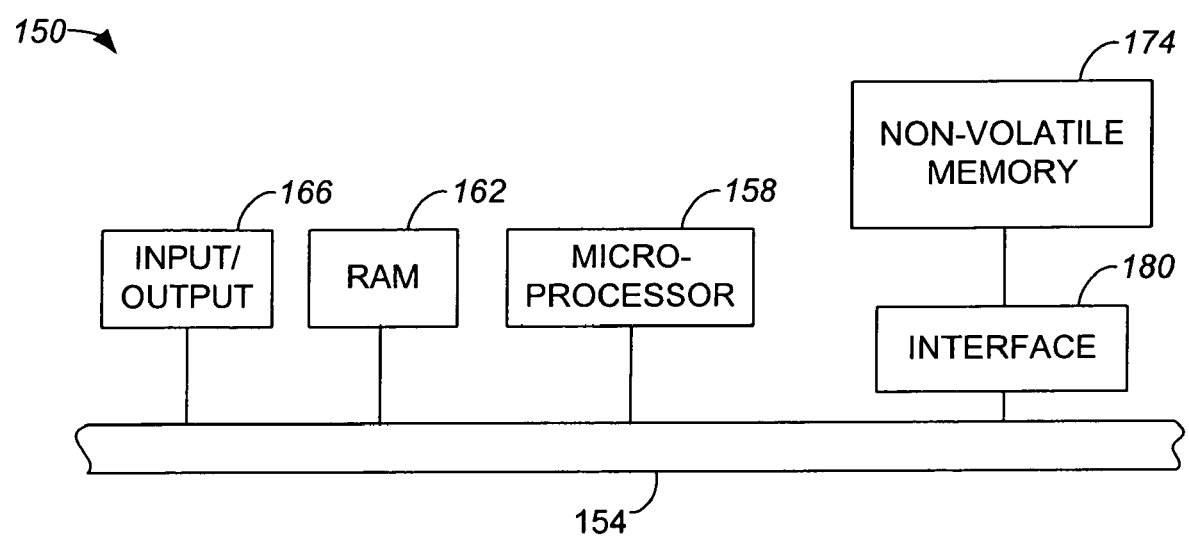
FIG. 2c is a diagrammatic representation of a host system which includes an embedded non-volatile memory.

In one embodiment, non-volatile memory such as an MLC NAND memory is embedded into a system, e.g., a host system. FIG. 2c is a diagrammatic representation of a host system which includes an embedded non-volatile memory. A host or computer system 150 generally includes a system bus 154 which allows a microprocessor 158, a RAM 162, and input/output circuits 166, among other components (not shown) of host system 150, to communicate. A non-volatile memory 174, e.g., a flash memory, allows information to be stored within host system 150. An interface 180 may be provided between non-volatile memory 174 and bus 154 to enable information to be read from and written to non-volatile memory 174.

Non-volatile memory 174 may be managed by microprocessor 158 which effectively executes either or both software and firmware which is arranged to control non-volatile memory 174. That is, microprocessor 158 may run code devices, i.e., software code devices or firmware code devices, which allow non-volatile memory 174 to be controlled. Such code devices, which will be described below, may enable physical blocks in non-volatile memory 174 to be addressed, and may enable information to be stored into, read from, and erased from the physical blocks.

Figure 3:
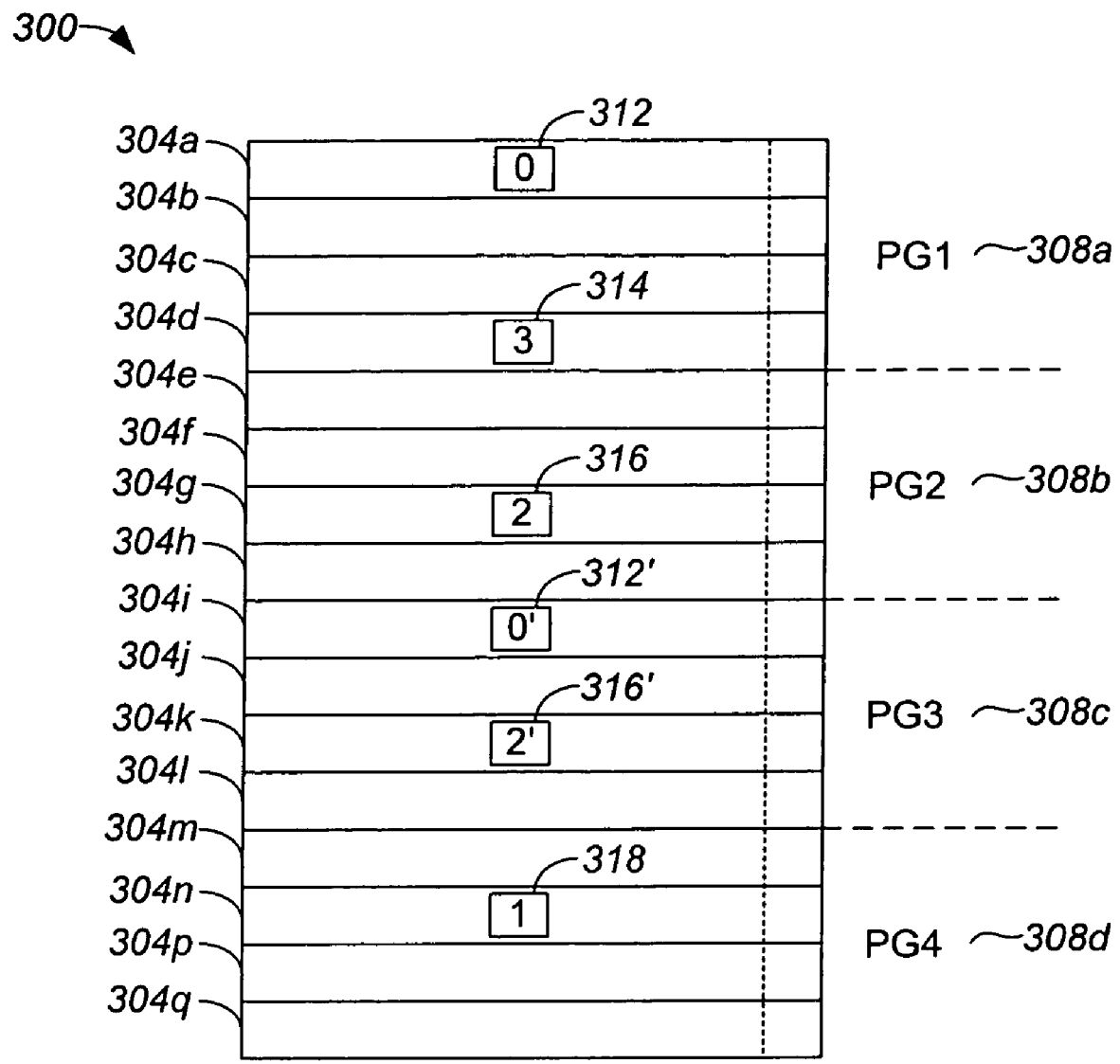
FIG. 3 is a diagrammatic representation of a physical block which is partitioned into groups which allow updates to be written substantially out-of-sequence in accordance with an embodiment of the present invention.

FIG. 3 is a diagrammatic representation of a physical block which is partitioned into groups which allow updates to be written substantially out-of-sequence in accordance with an embodiment of the present invention. A physical block 300 may generally include any number of pages 304. As shown, physical block 300 includes sixteen pages 304 which are divided into four groups 308. Hence, each group 308 may be considered as beginning at an offset of four pages 304 from the previous group 308. It should be appreciated, however, that the total number of pages 304, the number of groups 308, and the number of pages 304 in each group 308 may vary widely depending upon a variety of factors which may include, but is not limited to, the requirements of a particular memory system.

Physical block 300 may be an "update" physical block that is arranged to contain updated contents associated with a logical block (not shown) which effectively supercede older contents of the logical block. As shown, page 304a of first group 308a within block 300 includes contents 312 associated with a first page of the logical block (not shown) associated with block 300. When contents 312 are written into page 304a, the data area and the overhead or redundant area of page 304a are written to substantially simultaneously. First group 308a also includes fourth page 304d which includes contents 314 associated with the fourth page of the logical block (not shown).

Although pages 304b, 304c which are included in first group 308a are substantially empty, when further updated contents are to be stored in block 300, such contents may not be stored into pages 304b, 304c. Pages 304 within a group 308 may generally only be written sequentially such that no lower or previous page 304 may be written to once a higher page 304 has been written to. By way of example, when contents 316 associated with a third page of the logical block (not shown) which corresponds to block 300 are to be written into block 300, contents 316 are written into a third page 304g which is included in the next available group 308, i.e., group 308b. Third page 304g of second group 308b is the seventh overall page associated with block 300.

When contents 312 associated with the first page of the logical block (not shown) are to be superceded by updated contents 312', although pages 304e, 304f, 304h of second group 308b are substantially empty, updated contents 312' may not be written into second group 308b. Instead, updated contents 312' are written into a first page 304i of third group 308c, which is a ninth overall page associated with block 300. Generally, a new available group 308 may be obtained for use substantially any time either a partial write violation or an out-of-sequence violation with respect to a current group 308 would occur if updated contents were to be written into the current group 308. It should be appreciated that before updated contents 312' are written into first page 304i of third group 308c, fourth page 304h of second group 308b may be written into, but essentially only with contents associated with a fourth page of the logical block (not shown).

Once updated contents 312' are written into first page 304i of third group 308c, if updated contents 316' associated with the third page of the third page of the logical block (not shown) are to be written, then updated contents 316' may be written into a suitable page within third group 308c, namely third page 304k of third group 308c. It should be appreciated that after updated contents 316' are written, substantially only updated contents associated with contents 314, which are written into page 304d, may be written into group 308c. Other contents or updated contents are generally written into a fourth group 308d. For example, when contents 318, which are associated with the second page of the logical block (not shown) are to be written, contents 318 are stored into a second page 204n of fourth group 308d.

When contents are written into physical block 300, contents are written in a "downward" direction with respect to the sequence of pages. However, when contents are read from physical block 300, contents are read in an "upward" direction such that the most recent contents associated with any given logical page may be read and, outdated or superseded contents associated with the given logical page may effectively be ignored or disregarded. In other words, a writing process is generally performed starting at the beginning of physical block 300, whereas a reading process is generally performed starting at the end of physical block 300.

As contents associated with pages of a logical block (not shown) are written into groups 308, the pages of the logical block are effectively written into physical block 300 in a substantially out-of-sequence manner. That is, if physical block 300 is effectively "viewed" without groups 308, then it appears that contents associated with pages of the logical block (not shown) are written substantially out-of-sequence within physical block 300, e.g., contents 316 associated with a third page of the logical block are written after contents 314 associated with a fourth page of the logical block are written. However, contents are written substantially in-sequence within each group 308. Writing contents substantially in-sequence within each group 308, as for example within third group 308c, then with respect to physical block 300, contents are effectively written substantially out-of-sequence.

Figure 4A:
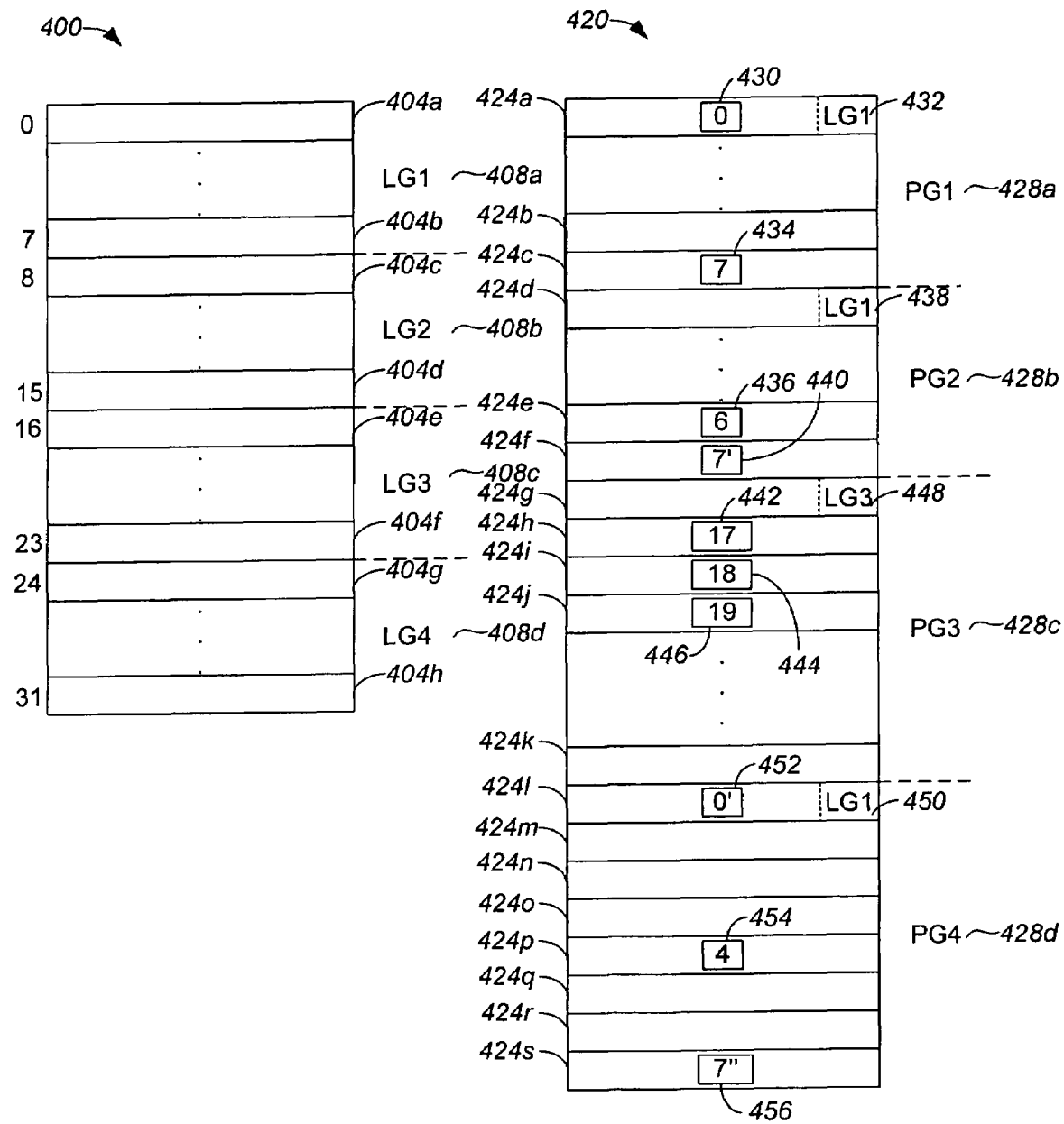
FIG. 4a is a diagrammatic representation a logical block which includes logical groups and a physical block which includes physical groups in accordance with an embodiment of the present invention.

In general, pages of a logical block may be divided into logical groups. Dividing or grouping pages of a logical block into logical groups enables the contents stored in physical groups of a physical block associated with the logical block to be more readily identified. With reference to FIG. 4a, a logical block which includes logical groups and a physical block which includes physical groups will be described in accordance with an embodiment of the present invention. A logical block 400, which includes logical pages 404 which are grouped into logical groups 408, is associated with a physical block 420. Physical block 420, which includes pages 424 which are grouped into physical groups 428, is associated with logical block 400 in that physical block 420 is arranged to contain contents, e.g., new or updated contents, which are associated with logical block 400. As such, physical block 420 may be considered to be an "update" physical block into which updated contents associated with logical block 400 may be stored.

Logical block 400 and physical block 420 may generally include any number of pages 404, 424, respectively. The number of pages 404, 424 may be dependent upon the requirements of a host system non-volatile memory system which includes blocks 400, 420. As shown, logical block 400 includes thirty-two pages 404, and physical block 420 includes thirty-two pages 424, although the number of pages may be widely varied. For example, blocks 400, 420 may include eight, sixteen, sixty-four, 128, or 256 pages. Similarly, although each group 408 includes eight pages 404 and each group 428 includes eight pages 424, the number of pages in a group may also vary widely depending upon the requirements of a host system.

Typically, each logical group 408 is identified by a logical group identifier, e.g., a first logical group 408a may be identified as 'LG1' while a second logical group 408b is identified as 'LG2.' In one embodiment, each logical group identifier may be a bit or a series of bits which uniquely identifies a logical group 408 within logical block 400. When contents associated with a logical page 404 are stored into a physical group 428, the contents are generally stored along with a logical group identifier which identifies which logical group the contents are associated with. As shown, when updated contents 430 which are associated with a first page 404a of first logical group 408a are to be written into block 420 and all physical groups 428a are available, then updated contents 430 are written into first page 424a of a first physical group 428a, along with a logical group identifier 432 which identifies contents of physical page 428a as being associated with first logical group 408a. Although logical group identifier 432 may be written into substantially any page 424 within a physical group 428 such first physical group 428a, logical group identifier 432 is typically written into a redundant or overhead area of first page 424 of a physical group 428 such as first page 424a of first physical group 428a.

Once first physical group 428a is associated with first logical group 408a, as for example using logical group identifier 432, pages 424 within first physical group 428a may generally only contain contents associated with pages 404 within first logical group 408a. That is, in the described embodiment, each physical group 428 contains contents associated with a single logical group 408. After first physical group 428a is associated with first logical group 408a, updated or new contents associated with first logical group 408a which are associated with logical pages 404 which are sequentially or numerically "after" first logical page 404a may be written or stored into pages 424 within first physical group 428a. By way of example, updated contents 434, which are associated with eighth logical page 404b, may be stored into physical page 424c.

When new or updated contents 436 associated with a seventh logical page (not shown) of logical group 408a are to be written into physical block 420, since such contents 436 may not be written into first physical group 428a, contents 436 are written into an appropriate page 424e in an available physical group 428, e.g., second physical group 428b. As shown, a logical group identifier 438 which identifies the contents of second physical group 428b as being associated with first logical group 408a is written into second physical group 428b, e.g., into a first physical page 424d of physical group 428b. Then, in the event that newer updated contents 440 which are associated with eighth logical page 404b are to be written, newer updated contents 440 may be written into an eighth physical page 424f associated with second physical group 428b.

If a subsequent update associated with logical block 400 is to occur after updated contents 440 are written into second physical group 428b, the new updated contents are written into the next available physical group 428. For example, if new or updated contents 422, 444, 446, which are associated with second through fourth logical pages 404 of third logical group 408c, respectively, are to be written into physical block 420, contents 422, 444, 446 are written into third physical group 428c. Specifically, contents 422 are written into second page 424h of third physical group 428c, contents 444 are written into third page 424i of third physical group 428c, and contents 446 are written into fourth page 424j of third physical group 428c. In order to readily identify third physical group 428c as being associated with third logical group 408c, a logical group identifier 448 which identifies third logical group 408c is stored into third physical group 428c, e.g., into an overhead area associated with first physical page 424g of third physical group 428c.

In order to avoid partial write violations or out-of-sequence violations, when additional updates are to be made to contents associated with logical group 408a, such updated contents are written into a fourth physical group 428d, even though there may be additional available pages, e.g., page 424k, within third physical group 428c. As shown, fourth physical group 428d includes a logical group identifier 450 which identifies first logical group 408a as being associated with fourth physical group 428d. Updated contents 452 which are associated with logical page 404a are stored into first page 424l of physical group 428d, while contents 454 which are associated with a fifth logical page (not shown) of first logical group 408a are written into fifth page 454p of fourth physical group 428d at some point after updated contents 452 are stored. Finally, updated contents 456, which are associated with logical page 404b, may be written into eighth physical page 424s of fourth physical group 428d.

Once there are no suitable physical groups 428 available within physical block 420 to accommodate updates associated with logical block 400, in one embodiment, the contents of physical block 420 may be merged with contents of an "original" physical block associated with logical block, e.g., into a new physical block, as will be discussed below with respect to FIGS. 4b and 4c. That is, since logical block 400 typically has more than one associated physical block, the physical blocks, including physical block 420, may be resolved. After the contents of physical block 420 are merged or otherwise resolved into a new physical block, another new physical block may be obtained to serve as an "update" physical block which is suitable for storing updated contents associated with logical block 400.

Resolving physical blocks which are associated with a common logical block typically includes determining which of the physical blocks was more recently associated with the logical block and, hence, contain the more recent contents associated with the common logical block, e.g., logical block 400. Update indexes, which are described in co-pending U.S. patent application Ser. No. 10/281,762, which is incorporated by reference, may be used to determine which of a plurality of physical blocks is more recently associated with a logical block. Often, when a logical block has more than one associated physical block and it is essentially necessary to identify one physical block to be associated with the logical block, the update indexes may be obtained from the physical blocks, as update indexes are arranged such that a comparison of update indexes from two physical blocks will identify which of the two physical blocks contains more current contents associated with the logical block.

An update index, which may be stored in at least one overhead or redundant area associated with a physical block, may be arranged to indicate which of two physical blocks involved in a copying, or a merging, process is an older physical block and which of the two physical blocks is the newer, or "update" physical block. For example, the update index of the new physical block may be set such that the value of that update index is higher than the update index of the old physical block. Hence, when the update indexes of the physical blocks are checked to determine which physical block is the "update" physical block, it may be determined that the physical block with the higher update index is the "update" physical block.

Figure 4B:
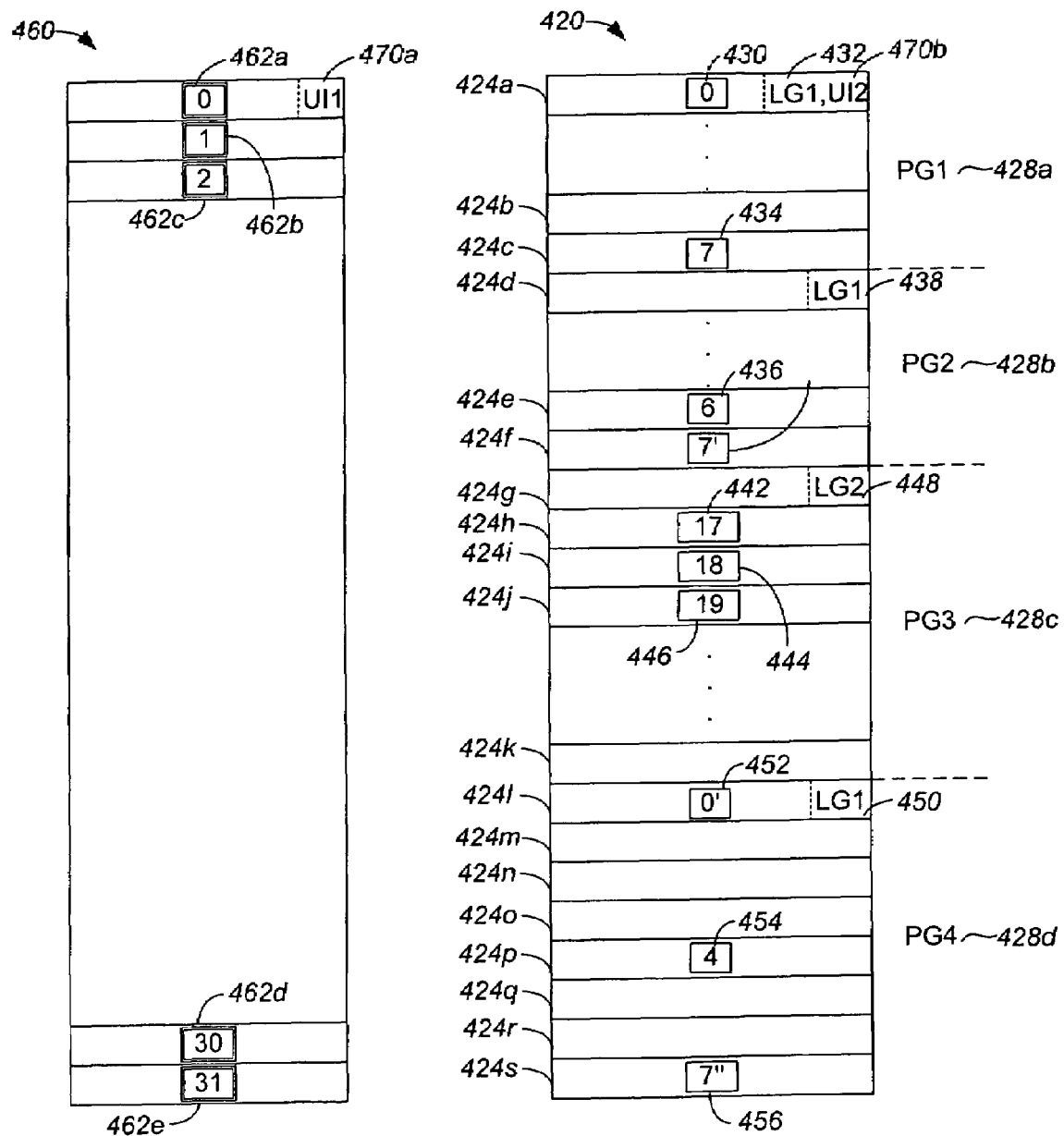
FIG. 4b is a diagrammatic representation of an older physical block and an "update" physical block, e.g., physical block 420 of FIG. 4a, which are associated with a common logical block, e.g., logical block 400 of FIG. 4a, in accordance with an embodiment of the present invention.

FIG. 4b is a diagrammatic representation of an older physical block and an "update" physical block, e.g., physical block 420 of FIG. 4a, which are associated with a common logical block, e.g., logical block 400 of FIG. 4a, in accordance with an embodiment of the present invention. When physical block 420 is unable to accept any more updates associated with logical block 400 of FIG. 4a, the contents of physical block 420 may be substantially merged with contents 462 of physical block 460 which may be an original physical block associated with logical block 400. That is, contents 462 of physical block 460 and contents of physical block 420 may effectively be compared to identify the most recent contents or data associated with logical block 400 of FIG. 4a. Typically, the most recent updated contents associated with logical block 400 of FIG. 4a will be located in physical block 420. However, the most recent contents associated with logical block 400 of FIG. 4a which have not been updated since they were written into physical block 460 will be obtained from physical block 460.

Figure 4C:
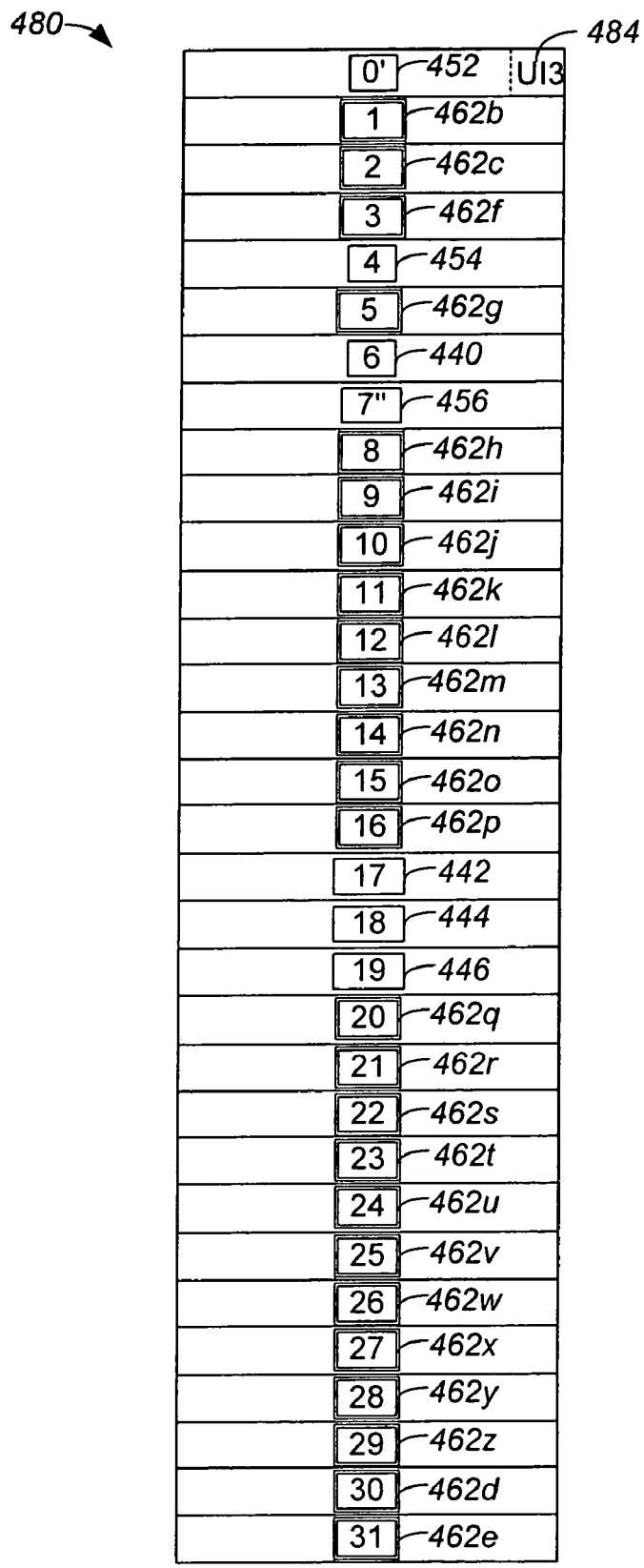
FIG. 4c is a diagrammatic representation of a physical block which includes contents associated with an original physical block and an "update" logical block, e.g., original physical block 460 and "update" physical block 420 of FIG. 4b, in accordance with an embodiment of the present invention.

Although the most recent contents associated with logical block 400 of FIG. 4a may be stored into physical block 420 in some cases, the most recent contents associated with logical block 400 are typically stored into a newly obtained physical block, e.g., block 480 of FIG. 4c. During a copying or a merging process involving physical blocks 420, 460, a read process may be performed beginning at the end of each block 420, 460. By way of example, page 424s of block 420 may be read first. When block 480 of FIG. 4c is written to with the most recent contents associated with logical block 400 of FIG. 4a, block 480 may be written beginning at the start of block 480.

In order to determine which block 420, 460 is a older block and which block 420, 460 is the "update" block which contains updated contents, update indexes 470 which are stored in overhead areas associated with each block 420, 460 may be compared. As update indexes 470 indicate which block 420, 460 is newer, when update index 470b indicates that block 420 is more recently associated with logical block 400 of FIG. 4a, then block 420 is determined to be the "update" block. Alternatively, when update index 470a indicates that block 460 is more recently associated with logical block 400 of FIG. 4a, then block 460 is determined to be the "update" block. In the described embodiment, since block 420 is the "update block," update index 470b is arranged to indicate that block 420 effectively newer than block 460.

When contents of block 420 are read, determinations may be made regarding which contents within block 420 are intended to supercede other contents within block 420. By way of example, when contents 456 are read, it may be determined that contents 456 supercede substantially any other contents which are associated with eighth logical page 404b of logical block 400 of FIG. 4a. Further, logical group indicators stored within block 420 may be used to facilitate a determination of which logical pages 404 of FIG. 4a are associated with contents of a particular group 428.

After physical blocks 420, 460 are resolved such that the most recent or current contents associated with logical block 400 of FIG. 4a are identified, the most recent contents may be written into physical block 480, as shown in FIG. 4c. As shown original contents 462 which were previously in physical block 460 of FIG. 4b and have not been superceded by any contents of physical block 420 of FIG. 4b are included in physical block 480, as are the most updated contents of physical block 420, namely contents 452, 454, 440, 456, 442, 444, 446. Physical block 480, in addition to containing the most recent contents associated with logical block 400 of FIG. 4a, may also contain an update index that may be stored in the overhead or redundant area of substantially any page within physical block 480.

Physical block 480 may generally be populated, e.g., physical blocks 420, 460 of FIG. 4b may be resolved, either when there are essentially no more updates to be written into physical block 420, or when physical block 420 is unable to accommodate further updates. When physical block 480 is populated because further updates may not be stored into physical block 420 of FIG. 4b, then once physical block 480 is populated, a new "update" physical block may be obtained. In one embodiment, an update index in the new "update" physical block may be set to indicate that the new "update" physical block is more newly associated with logical block 400 of FIG. 4a than physical block 480.

Figure 5:
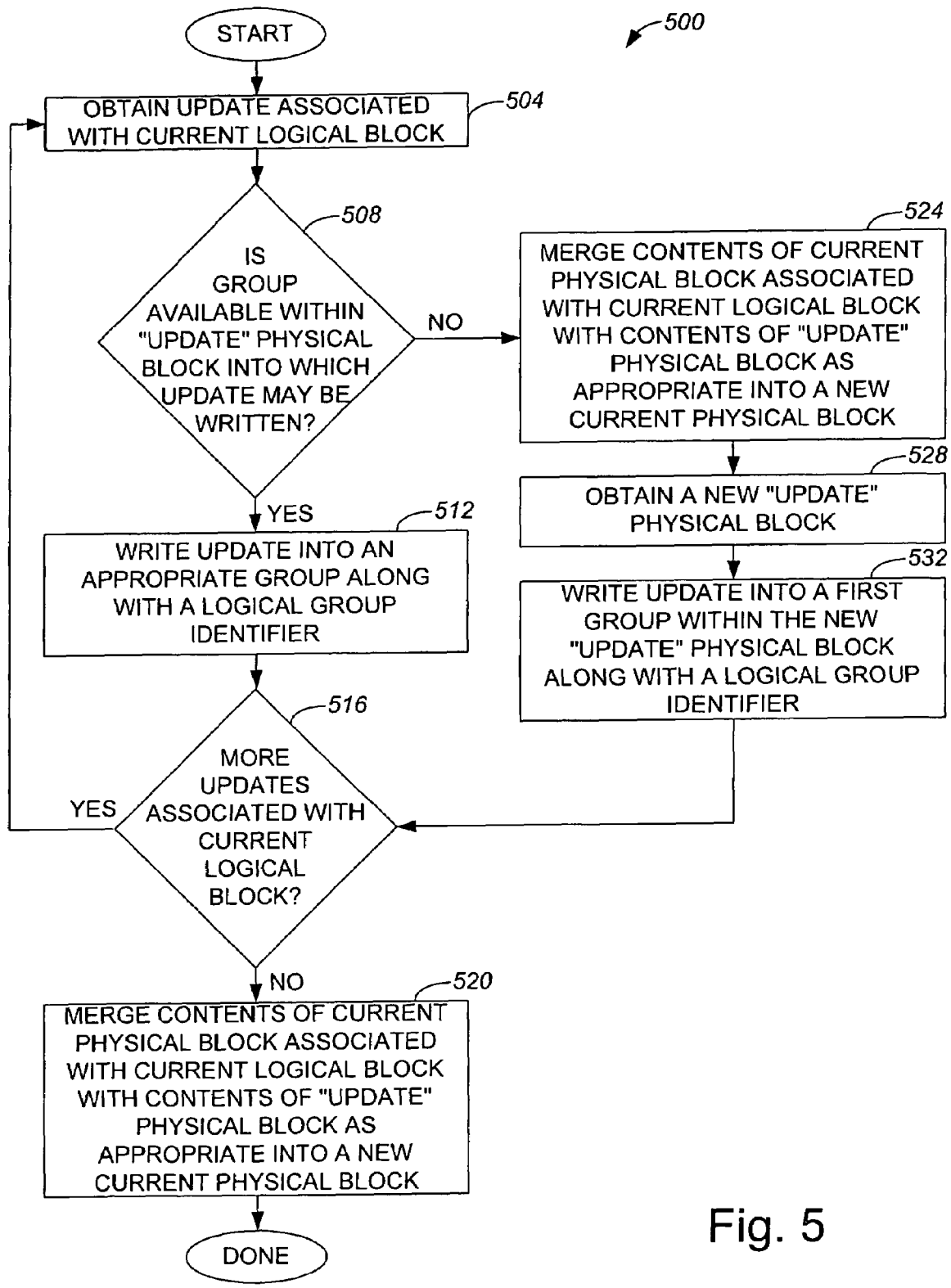
FIG. 5 is a process flow diagram which illustrates the steps associated with one method of performing a write process that may be considered to be an out-of-sequence write process in accordance with an embodiment of the present invention.

With reference to FIG. 5, the steps associated with one method of performing a write process which may be considered to be an out-of-sequence write process will be described in accordance with an embodiment of the present invention. A process 500 of writing an update or updates into a physical bock begins at step 504 in which an update that is associated with a current logical block is obtained. The update may be obtained when a host system provides new or changed data that is associated with the current logical block. Once the update is obtained, a determination is made in step 508 as to whether a suitable physical group is available within an "update" physical block into which the update may be written. An "update" physical block may be a physical block which is arranged to contain updated or new information associated with the current logical block, and is substantially divided into groups which are identified by physical group numbers and may each correspond to a logical group of the current logical block, as described above.

When it is determined that there is an available or appropriate group, then the indication is that either a current group, i.e., the most recent group to be written into, has space for the update, or there is a new group which may be written into. Accordingly, process flow moves to step 512 in which the update is written into the appropriate group in the "update" physical block. Typically, in addition to writing the update into the appropriate group, an identifier which identifies the logical group with which the update is associated is also written into the appropriate group.

Once the update is written into an appropriate group, a determination is made in step 516 regarding whether there are more updates associated with the current logical block. If it is determined that there are more updates associated with the current logical block, then process flow returns to step 504 in which the next update associated with the current logical block is obtained. Alternatively, if it is determined that there are no more updates associated with the current logical block, then contents of a current physical block, e.g., the contents of the physical block which contains "original" contents that were associated with the current logical block before the updates associated with the current logical block were effectively processed, may be merged in step 520 with contents of the "update" physical block as appropriate. The contents of the two physical blocks may be merged into a new current physical block, in one embodiment. After the contents of the current physical blocks and the "update" physical block are merged or otherwise resolved, the process of writing an update or updates is completed.

Returning to step 508, if it is determined that there is no group available within the "update" physical block into which the current update associated with the current logical block may be written, then process flow moves to step 524 in which a new current physical block is obtained. Specifically, in the described embodiment, the contents of the current physical block associated with the current logical block are merged or resolved with the contents of the "update" physical block, as appropriate, into a single physical block. Once the single physical block, which is a new current physical block associated with the current logical block, is written to with the most recent information associated with the current logical block, then a new "update" physical block into which updates associated with the current logical block may be stored is obtained in step 528. In one embodiment, obtaining the new "update" physical block may include setting an update index associated with the new "update" physical block to an appropriate value with respect to the value of an update index in the current physical block.

After the new "update" physical block is obtained, the current update associated with the current logical block may be written in step 532 into a first group within the new "update" physical block. Typically, the update is written into the first physical group along with an identifier which identifies a logical group in the current logical block with which the update is associated. Process flow then moves to step 516 in which it is determined whether there are more updates associated with the current logical block.

Figure 6:
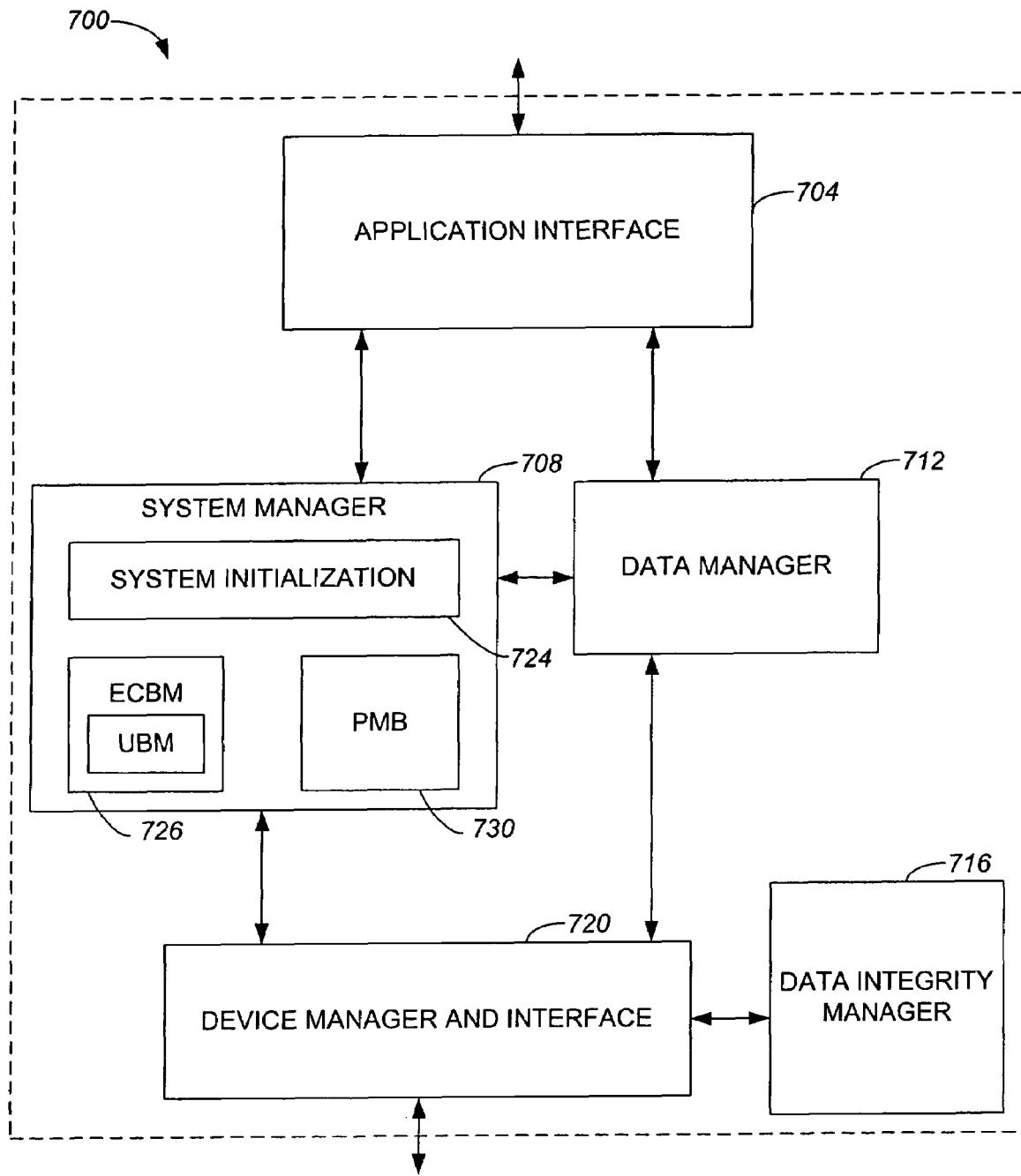
FIG. 6 is a diagrammatic block diagram representation of a system architecture in accordance with an embodiment of the present invention.

In general, the functionality associated with implementing, maintaining, and utilizing a power management block is provided in software, e.g., as program code devices, or as firmware to a host system which includes a non-volatile memory or non-volatile memory component. One embodiment of a suitable system architecture associated with the software or firmware provided to a host system to enable a power management block to be implemented, maintained, and used is shown in FIG. 6. A system architecture 700 generally includes a variety of modules which may include, but are not limited to, an application interface module 704, a system manager module 708, a data manager module 712, a data integrity manager 716, and a device manager and interface module 720. In general, system architecture 700 may be implemented using software code devices or firmware which may be accessed by a processor, e.g., processor 108 of FIG. 2a.

In general, application interface module 704 may be arranged to communicate with a non-volatile memory such as a flash memory (not shown) or, more generally, a media, to initialize the media during the course of an initialization, or system formatting, request. Application interface module 704 may also read from, as well as write to, a sector, a cluster, or a page associated with the media. Typically, in addition to communicating with a media, application interface module 704 is also in communication with system manager module 708 and data manager module 712.

System manager module 708 includes a system initialization submodule 724, an erase count block management submodule 726, and a power management block submodule 730. System initialization submodule 724 is generally arranged to enable an initialization request to be processed, and typically communicates with erase count block management submodule 726. Erase count block management submodule 726 includes functionality to cause erase counts of blocks to be stored, and functionality to cause an average erase count to be calculated, as well as updated, using individual erase counts. System initialization module 724 is also arranged to resolve a one-to-many logical-to-physical block assignment and, hence, may utilize update indexes.

In addition to being in communication with application interface module 704, system manager module 708 is also in communication with data manager module 712, as well as device manager and interface module 720. Data manager module 712, which communicates with both system manager module 708 and application interface module 704, may include functionality to provide sector mapping which effectively translates logical sectors into physical sectors. That is, data manager module 712 is arranged to map logical blocks into physical blocks. Data manager module 712 may also include functionality associated with operating system and file system interface layers, and enables groups within blocks to be managed, as described in co-pending U.S. patent application Ser. No. 10/281,855, which is incorporated herein by reference in its entirety. In one embodiment, data manager module 712 may be arranged to enable a substantially out-of-sequence write process to occur.

Device manager and interface module 720, which is in communication with system manager module 708, data manager 712, and data integrity manager 716, typically provides a flash memory interface, and includes functionality associated with hardware abstractions, e.g., an I/O interface. Data integrity manager module 716 provides ECC handling, among other functions.

Although only a few embodiments of the present invention have been described, it should be understood that the present invention may be embodied in many other specific forms without departing from the spirit or the scope of the present invention. By way of example, the use of groups to enable an essentially out-of-sequence write to occur has generally been described as being associated with a NAND memory, e.g., an MLC NAND memory. In general, however, an essentially out-of-sequence write which involves dividing blocks into groups may be implemented with respect to substantially any suitable memory or memory system.

An update index has been described as being suitable for use in enabling an "update" physical block and a current physical block to be resolved. It should be appreciated, however, that substantially any suitable method, as for example a method which does not involve the use of an update index, may be used to enable the a plurality of physical blocks to be resolved.

The steps associated with the various methods of the present invention may be widely varied. In general, steps may be added, removed, reordered, and altered without departing from the spirit or the scope of the present invention. For instance, when an update associated with a particular logical group within a logical block is to be written into an appropriate physical group within an "update" physical block and that update is the first update to be written into the physical group, then writing the update may include writing an identifier into the physical group which identifies the physical group as being associated with the logical group. While such an indicator may be written into substantially any page of the physical group, such an indicator is often written into the first page, i.e., the beginning page, of the physical group. It should be appreciated that the indicator may be written before the update is written, or the indicator may be written at substantially the same time as the update, e.g., when the update is written into the first page of the physical group. Therefore, the present examples are to be considered as illustrative and not restrictive, and the invention is not to be limited to the details given herein, but may be modified within the scope of the appended claims.

What is claimed is:

1. A method for performing a write operation in a non-volatile memory system, the non-volatile memory system including an MLC NAND flash non-volatile memory having a plurality of erase units, each erase unit including a plurality of programming units arranged in a sequence, each programming unit comprising a plurality of non-volatile memory cells, wherein a first logical block is mappable to one or more erase units and includes a plurality of logical pages arranged in a sequence, the method comprising:
   writing data associated with the first logical block into an original erase unit to which the first logical block is mapped, so that data associated with the logical pages are written into corresponding programming units in that original erase unit in sequence;
   grouping the programming units within a first update erase unit into a plurality of groups of programming units, the programming units within each group arranged in a sequence comprising a first programming unit, a second programming unit, and a third programming unit;
   writing contents of an updated first logical page into the first programming unit in a first group of programming units of the first update erase unit;
   writing contents of an updated third logical page into the third programming unit of the first group of programming units, the third logical page later in the sequence of logical pages than the first logical page, and the third programming unit later in the sequence of programming units within the first group than the first programming unit and the second programming unit;
   receiving contents of an updated second logical page of the first logical block, the second logical page earlier in the sequence of logical pages than the third logical page;
   determining whether one of the groups of programming units in the first update erase unit is available for writing into;
   responsive to a group of programming units being available in the first update erase unit, writing updated contents of the second logical page into a programming unit in an available group of programming units of the first update erase unit; and
   responsive to none of the groups of programming units being available in the first update erase unit, merging contents associated with the first logical block stored in the original erase unit and updated contents of the first logical block stored in the first update erase unit into a second update erase unit.

2. The method of claim 1, wherein writing undated contents of the second logical page further comprises:
   after writing updated contents of the second logical page, writing updated contents of a fourth logical page into a programming unit of the available group, the fourth logical page later in the sequence of logical pages than the second logical page.

3. The method of claim 1 wherein each of the erase units is a physical block;
   and wherein each of the programming units is a physical page.

4. The method of claim 2 wherein the first logical page is included in a first logical grouping within the first logical block and the fourth logical page is included in a second logical grouping within the first logical block;
   and wherein the method further comprises:
   writing a first indicator into the first group of programming units that identifies the first group of programming units as associated with the first logical grouping; and
   writing a second indicator into the available group of programming units that identifies the available group of programming units as associated with the second logical grouping.

5. A non-volatile memory system comprising:
   an MLC NAND flash non-volatile memory having a plurality of erase units, each erase unit including a plurality of programming units arranged in a sequence, each programming unit comprising a plurality of non-volatile memory cells,
   means for mapping each of a plurality of logical blocks with corresponding erase units, each logical block including a plurality of logical pages; and
   means for controlling the writing of contents into the non-volatile memory according to groups of programming units within the erase units, the programming units within each group arranged in sequence comprising a first programming unit, a second programming unit, and a third programming unit, according to a sequence of operations comprising:
   writing data associated with a first logical block into an original erase unit to which the first logical block is mapped so that data associated with the logical pages are written into corresponding programming units in that original erase unit in sequence;
   writing contents of a first logical page into the first programming unit in a first group of programming units of a first update erase unit;
   then writing contents of an updated third logical page into the third programming unit of the first group of programming units, the third logical page later in a sequence of logical pages than the first logical page, and the third programming unit later in the sequence of programming units than the first programming unit and the second programming unit; and receiving contents of an updated second logical page of the first logical block, the second logical page earlier in the sequence of logical pages than the third logical page;

determining whether one of the groups of programming units in the first update erase unit is available for writing into;

responsive to a group of programming units being available in the first update erase unit, writing updated contents of the second logical page into a programming unit in an available group of programming units of the first update erase unit; and responsive to none of the groups of programming units being available in the first update erase unit, merging contents associated with the first logical block stored in the original erase unit and updated contents of the first logical block stored in the first update erase unit into a second update erase unit.

6. The method of claim 1, wherein the step of writing undated contents of the second logical page writes the contents into a second programming unit in the available group of programming units of the first update erase unit, the second programming unit later in a sequence of programming units than a first programming unit in the available group, and earlier in the sequence of programming units than a third programming unit in the available group.

7. The system of claim 5, wherein the operation of writing updated contents of the second logical page writes the contents into a second programming unit in the available group of programming units of the first update erase unit, the second programming unit later in a sequence of programming units than a first programming unit in the available group, and earlier in the sequence of programming units than a third programming unit in the available group.

8. The non-volatile memory system of claim 5, wherein the controlling means comprises:

code devices for performing the sequence of operations; and a processor for accessing and executing the code devices.

9. The non-volatile memory system of claim 5, wherein each of the erase units is a physical block; and wherein each of the programming units is a physical page.

* * * * *

UNITED STATES PATENT AND TRADEMARK OFFICE
CERTIFICATE OF CORRECTION

PATENT NO.          : 7,526,599 B2
APPLICATION NO. : 10/679008
DATED                   : April 28, 2009
INVENTOR(S)        : Robert C. Chang et al.

Page 1 of 1

It is certified that error appears in the above-identified patent and that said Letters Patent is hereby corrected as shown below:

<u>In the Claims</u>

In column 17, claim 6, line 20, before "contents of the second logical" delete "undated" and substitute --updated-- in its place.

Signed and Sealed this

Fifteenth Day of September, 2009

David J. Kappos
*Director of the United States Patent and Trademark Office*